(12) United States Patent
Yamada et al.

(10) Patent No.: US 8,551,658 B2
(45) Date of Patent: Oct. 8, 2013

(54) PROCESS FOR PRODUCING LITHIUM-CONTAINING COMPOSITE OXIDE

(75) Inventors: Ryoji Yamada, Chigasaki (JP); Koji Tatsumi, Chigasaki (JP); Shogo Nakaoka, Chigasaki (JP); Kenji Ito, Chigasaki (JP); Kazuya Hiratsuka, Chigasaki (JP)

(73) Assignee: AGC Seimi Chemical Co., Ltd., Chigasaki-shi (JP)

( * ) Notice: Subject to any disclaimer, the term of this patent is extended or adjusted under 35 U.S.C. 154(b) by 1610 days.

(21) Appl. No.: 11/828,009

(22) Filed: Jul. 25, 2007

(65) Prior Publication Data

US 2007/0264573 A1 Nov. 15, 2007

Related U.S. Application Data

(63) Continuation of application No. PCT/JP2006/319075, filed on Sep. 26, 2006.

(30) Foreign Application Priority Data

Sep. 28, 2005 (JP) ................................. 2005-282535

(51) Int. Cl.
*H01M 4/13* (2010.01)

(52) U.S. Cl.
USPC .... 429/231.95; 429/223; 429/224; 429/231.9

(58) Field of Classification Search
USPC ........................... 429/231.95, 223, 224, 231.9
See application file for complete search history.

(56) References Cited

U.S. PATENT DOCUMENTS

| | | | |
|---|---|---|---|
| 5,147,738 A | 9/1992 | Toyoguchi | |
| 6,497,854 B2 | 12/2002 | Kohiro et al. | |
| 6,949,233 B2 | 9/2005 | Kweon et al. | |
| 2003/0124424 A1* | 7/2003 | Takahashi et al. | ......... 429/231.1 |
| 2003/0211235 A1 | 11/2003 | Suh et al. | |
| 2003/0211391 A1 | 11/2003 | Cho et al. | |

FOREIGN PATENT DOCUMENTS

| | | | |
|---|---|---|---|
| JP | 3-201368 | | 9/1991 |
| JP | 10-134811 | | 5/1998 |
| JP | 11-70322 | | 3/1999 |
| JP | 2000-082466 | * | 3/2000 |
| JP | 2002-170562 | | 6/2002 |
| JP | 2002-373658 | | 12/2002 |
| JP | 2003-331845 | | 11/2003 |
| JP | 2003-331846 | | 11/2003 |
| JP | 2004-220897 | | 8/2004 |
| JP | 2005-123180 | | 5/2005 |

* cited by examiner

*Primary Examiner* — Helen O Conley
(74) *Attorney, Agent, or Firm* — Oblon, Spivak, McClelland, Maier & Neustadt, L.L.P.

(57) ABSTRACT

To provide a process for a lithium-containing composite oxide for a positive electrode for a lithium secondary battery, which has a large volume capacity density and high safety, and is excellent in the charge and discharge cyclic durability and low temperature characteristics.

A process for producing a lithium-containing composite oxide represented by the formula $Li_pN_xM_yO_zF_a$ (wherein N is at least one element selected from the group consisting of Co, Mn and Ni, M is at least one element selected from the group consisting of Al, alkaline earth metal elements and transition metal elements other than N, $0.9 \le p \le 1.2$, $0.95 \le x \le 2.00$, $0 < y \le 0.05$, $1.9 \le z \le 4.2$ and $0 \le a \le 0.05$), which comprises firing a mixture of a lithium source, an N element source, an M element source and if necessary, a fluorine source, characterized in that an aqueous solution having an M element source dissolved therein is mixed with an N element source powder or its pulverized product to form a slurry; if necessary after being pulverized, the slurry is dried for granulation to obtain a granulated product, which is mixed with a lithium source powder and if necessary, a fluorine source powder to obtain a mixture; and the mixture is fired at from 700 to 1,100° C. in an oxygen-containing atmosphere.

11 Claims, No Drawings

PROCESS FOR PRODUCING LITHIUM-CONTAINING COMPOSITE OXIDE

TECHNICAL FIELD

The present invention relates to a process for producing a lithium-containing composite oxide useful for a positive electrode for a lithium secondary battery, which has a large volume capacity density, high safety and excellent durability for charge and discharge cycles and the low temperature characteristics, a positive electrode for a lithium secondary battery containing the produced lithium-containing composite oxide, and a lithium secondary battery.

BACKGROUND ART

Recently, as the portability and cordless tendency of instruments have progressed, a demand for a non-aqueous electrolyte secondary battery such as a lithium secondary battery which is small in size and light in weight and has a high energy density, has been increasingly high. As a cathode active material for the non-aqueous electrolyte secondary battery, a composite oxide of lithium and a transition metal (hereinafter referred to as a lithium-containing composite oxide) such as $LiCoO_2$, $LiNi_{1/3}Co_{1/3}Mn_{1/3}O_2$, $LiNi_{0.8}Co_{0.2}O_2$, $LiMn_2O_4$ or $LiMnO_2$, has been known.

A lithium secondary battery using $LiCoO_2$ among such lithium-containing composite oxides as a cathode active material and using a lithium alloy or carbon such as graphite or carbon fiber as a negative electrode, can obtain a high voltage at a level of 4V, whereby it has been widely used as a battery having a high energy density.

However, in the case of the non-aqueous type secondary battery using $LiCoO_2$ as a cathode active material, further improvement of the capacity density per unit volume of a positive electrode layer and the safety, has been desired. On the other hand, there has been a problem of deterioration of the cyclic properties such as gradual reduction of the battery discharge capacity due to repetitive charge and discharge cycles, a problem of the weight capacity density or substantial reduction of the discharge capacity at a low temperature.

In order to solve such problems, Patent Document 1 proposes to replace 5 to 35% of Co atoms in $LiCoO_2$ with W, Mn, Ta, Ti or Nb to improve the cyclic properties. Further, Patent Document 3 proposes to use hexagonal $LiCoO_2$ as a cathode active material to improve the cyclic properties, wherein the c axis length of the lattice constant is at most 14.051 Å, and the crystal lattice size in (110) direction of the crystal lattice is from 45 to 100 nm.

Further, Patent Document 2 proposes to produce a Li—Ni—Co composite oxide or a Li—Ni—Mn composite oxide by pulverizing a coprecipitate of Ni and Co, or Ni and Mn, then drying and granulating it by a spray dryer, and adding a powder of a lithium compound thereto, followed by mixing and firing.

Further, Patent Document 3 proposes a method for producing a lithium composite oxide, wherein a nickel material, a cobalt material and a manganese material are wet-pulverized, the obtained pulverized product is granulated by spray drying, the obtained granulated product is further dry-mixed with a lithium material, and the obtained dry-mixed product is fired to obtain a Li—Ni—Co—Mn composite oxide.

However, also in this case, a cathode active material having a high volume capacity density can hardly be obtainable, and the method is inadequate also with respect to the cyclic characteristics, safety and large current discharge characteristics.

Further, Patent Document 4 proposes a process for producing a cathode active material for a lithium secondary battery, which comprises a step of mixing a lithium source, a metal source and a doping liquid in the form of a solution or suspension containing a doping element, and a step of heat-treating the mixture.

Patent Document 5 proposes a process for producing a cathode active material for a lithium secondary battery, which comprises adding a metal starting material to a coating liquid in the form of a solution or suspension containing a doping element soluble in water or in an organic solvent, thereby to have the metal starting material surface-treated, then drying it to prepare a precursor, mixing it further with a lithium starting material, followed by heat treatment. In its specific embodiment, a doping element solution using an organic solvent, or an aqueous suspension solution containing a doping element made of boron, is used as the doping liquid.

Further, Patent Document 6 proposes a process for producing a cathode active material for a battery, which comprises treating particles of a metal salt with a colloidal aqueous coating solution obtained by adding water to $(NH_4)_2HPO_4$ and $Al(NO_3)_3.3H_2O$, followed by drying, then mixing with a lithium compound and heat treatment. However, the obtained cathode active material is unsatisfactory in the battery performance i.e. the discharge capacity, the durability for charge and discharge cycles and the safety.

As described above, in the prior art, with respect to a lithium secondary battery employing a lithium composite oxide as a cathode active material, it has not yet been possible to obtain one which sufficiently satisfies all of the volume capacity density, the safety, the coating uniformity, the cyclic properties as well as the low temperature characteristics and the production costs.

Patent Document 1: JP-A-3-201368
Patent Document 2: JP-A-10-134811
Patent Document 3: JP-A-2005-123180
Patent Document 4: JP-A-2002-373658
Patent Document 5: JP-A-2003-331845
Patent Document 6: JP-A-2003-331846

DISCLOSURE OF THE INVENTION

Object to be Accomplished by the Invention

It is an object of the present invention to provide a process for producing a lithium-containing composite oxide for a positive electrode for a lithium secondary battery, which has a large volume capacity density, high safety and excellent durability for charge and discharge cycles and is further excellent in the low temperature characteristics with a low production cost; a positive electrode for a lithium secondary battery containing the produced lithium-containing composite oxide; and a lithium secondary battery containing the produced lithium-containing composite oxide.

Means to Accomplish the Object

The present inventors have conducted extensive studies and as a result, have found that when an M element as an element to be substituted for an N element is permitted to act in the form of an aqueous solution of an M element source on an N element source powder or its pulverized product, followed by drying for granulation, the N element such as cobalt in a lithium-containing composite oxide will be replaced by the M element sufficiently and uniformly, whereby the above object can be accomplished, and a lithium-containing composite oxide suitable for a positive electrode for a lithium secondary battery can be obtained.

Thus, the present invention provides the following:

(1) A process for producing a lithium-containing composite oxide represented by the formula $Li_pN_xM_yO_zF_a$ (wherein N is at least one element selected from the group consisting of Co, Mn and Ni, M is at least one element selected from the group consisting of Al, alkaline earth metal elements and transition metal elements other than N, $0.9 \leq p \leq 1.2$, $0.95 \leq x \leq 2.00$, $0 < y \leq 0.05$, $1.9 \leq z \leq 4.2$ and $0 \leq a \leq 0.05$), which comprises firing a mixture of a lithium source, an N element source, an M element source and if necessary, a fluorine source, characterized in that an aqueous solution having an M element source dissolved therein is mixed with an N element source powder or its pulverized product to form a slurry; if necessary after being pulverized, the slurry is dried for granulation to obtain a granulated product, which is mixed with a lithium source powder and if necessary, a fluorine source powder to obtain a mixture; and the mixture is fired at from 700 to 1,100° C. in an oxygen-containing atmosphere.

(2) The process according to (1), wherein the N element source powder in the slurry before drying for granulation has an average particle size (D50) of from 0.1 to 3 μm, and the granulated product has an average particle size (D50) of from 5 to 25 μm.

(3) The process according to (1) or (2), wherein the aqueous solution having an M element source dissolved therein is an aqueous solution containing a carboxylate.

(4) The process according to (3), wherein the carboxylate is a salt of a carboxylic acid which has at least one carboxyl group, and at least one hydroxyl group and/or at least one carbonyl group.

(5) The process according to (3) or (4), wherein the carboxylate is a $C_{1-8}$ aliphatic carboxylate.

(6) The process according to any one of (3) to (5), wherein the carboxylate is a salt of at least one carboxylic acid selected from the group consisting of citric acid, oxalic acid, glyoxylic acid, lactic acid and tartaric acid.

(7) The process according to any one of (3) to (5), wherein the carboxylate is an ammonium salt of formic acid or acetic acid.

(8) The process according to (1) or (2), wherein the M element source is zirconium ammonium carbonate and/or a zirconium ammonium halide.

(9) The process according to any one of (1) to (8), wherein the aqueous solution having an M element source dissolved therein has a pH of from 2 to 12.

(10) The process according to any one of (1) to (9), wherein the N element source is at least one member selected from the group consisting of cobalt hydroxide, cobalt oxyhydroxide, tricobalt tetroxide and cobalt carbonate.

(11) The process according to any one of (1) to (9), wherein the N element source is at least one member selected from the group consisting of a nickel salt, a cobalt salt, a manganese salt, a nickel-cobalt coprecipitate, a nickel-manganese coprecipitate and a nickel-cobalt-manganese coprecipitate.

(12) A positive electrode for a lithium secondary battery containing a lithium-containing composite oxide produced by the process as defined in any one of (1) to (11).

(13) A lithium secondary battery using the positive electrode for a lithium secondary battery as defined in (12).

(14) A process for producing a granulated product containing an N element source and an M element source in a ratio of N element:M element being from 0.95:0.05 to 0.9995:0.0005 (wherein N is at least one element selected from the group consisting of Co, Mn and Ni, and M is at least one element selected from the group consisting of Al, alkaline earth metal elements and transition metal elements other than N), which comprises mixing an aqueous solution having an M element source dissolved therein with an N element source powder or its pulverized product to form a slurry, and drying the slurry for granulation, if necessary after pulverizing it.

(15) The process according to (14), wherein the N element source is at least one compound selected from the group consisting of a hydroxide, an oxyhydroxide, an oxide and a carbonate.

(16) The process according to (14) or (15), wherein the aqueous solution having an M element source dissolved therein is an aqueous solution containing a salt of at least one carboxylic acid selected from the group consisting of citric acid, oxalic acid, glyoxylic acid, lactic acid and tartaric acid.

Effects of the Invention

According to the present invention, it is possible to provide a process for producing a lithium-containing composite oxide such as a lithium-cobalt composite oxide suitable for a positive electrode for a lithium secondary battery, which has a large volume capacity density, high safety and excellent durability for charge and discharge cycles and is further excellent in the low temperature characteristics, a positive electrode for a lithium secondary battery containing the produced lithium-containing composite oxide, and a lithium secondary battery containing the produced lithium-containing composite oxide.

BEST MODE FOR CARRYING OUT THE INVENTION

The lithium-containing composite oxide useful for a positive electrode for a lithium secondary battery obtainable by the process of the present invention, is represented by the formula $Li_pN_xM_yO_zF_a$. In such a formula, p, x, y, z and a are as defined above. Particularly, p, x, y, z and a are preferably $0.97 \leq p \leq 1.03$, $0.97 \leq x \leq 2.00$, $0.0005 \leq y \leq 0.03$, $1.95 \leq z \leq 4.05$ and $0.001 \leq a \leq 0.01$, respectively, more preferably $0.97 \leq p \leq 1.03$, $0.97 \leq x \leq 0.9995$, $0.0005 \leq y \leq 0.03$, $1.95 \leq z \leq 2.05$ and $0.001 \leq a \leq 0.01$, respectively. Further, x and y are preferably $0.975 \leq x \leq 0.999$, $0.001 \leq y \leq 0.025$ and $x+y=1$, particularly preferably $0.975 \leq x \leq 0.998$, $0.002 \leq y \leq 0.025$ and $x+y=1$. Here, when a is larger than 0, the formula represents a composite oxide having some of its oxygen atoms substituted by fluorine atoms. In such a case, the safety of the obtained cathode active material will be improved.

N is at least one element selected from the group consisting of Co, Mn and Ni. It is particularly preferably Co, Ni, Co and Ni, Mn and Ni, or "Co and Ni and Mn". M is at least one element selected from the group consisting of aluminum, alkaline earth metals and transition metal elements other than the N element. Here, the transition metal elements represent transition metals of Groups 4, 5, 6, 7, 8, 9, 10, 11 and 12 of the Periodic Table. Among them, the M element is preferably at least one element selected from the group consisting of Ti, Zr, Hf, Nb, Ta, Mg, Sn, Zn and Al. Particularly preferred from the viewpoint of the capacity development properties, the safety, the cyclic durability, etc., is Ti, Zr, Nb, Mg or Al.

In the present invention, it is particularly preferred that the M element as an element to be substituted for the N element comprises Al and Mg, wherein the Al/Mg atomic ratio is preferably from 1/3 to 3/1, particularly preferably from 2/3 to 3/2, and y is preferably $0.005 \leq y \leq 0.025$, particularly preferably $0.01 \leq y \leq 0.02$, whereby the balance of the battery performance, i.e. the balance of the initial weight capacity density, the safety, and the stability for is charge and discharge cycles, is good. Further, in the present invention, it is particularly preferred that the M element comprises Mg and M2 (M2 is at least one element selected from the group consisting of Ti, Zr, Ta and Nb), wherein the M2/Mg atomic ratio is preferably from 1/40 to 2/1, more preferably from 1/30 to 1/5, and y is preferably $0.005 \leq y \leq 0.025$, more preferably $0.01 \leq y \leq 0.02$, whereby the balance of the battery performance i.e. the balance of the initial weight capacity density, the initial volume capacity density, the safety and the stability for charge and discharge cycles, is good.

Further, in the present invention, it is particularly preferred that the M element comprises Zr and Mg, and the Zr/Mg atomic ratio is preferably from 1/40 to 2/1, more preferably from 1/30 to 1/5, and y is preferably $0.005 \leq y \leq 0.025$, more preferably $0.01 \leq y \leq 0.02$, whereby the balance of the battery performance, i.e. the balance of the initial weight capacity density, the initial volume capacity density, the safety and the charge and discharge cyclic stability, is good.

Further, in the present invention, it is preferred that the M element comprises Mg and Al, and further Zr coexists, whereby the balance of the battery performance, i.e. the balance of the initial weight capacity density, the initial volume capacity density, the safety, and the stability for charge and discharge cycles, is good. In such a case, Zr coexists preferably in an amount of from 1/2 to 1/20 based on the total number of mols of Mg and Al.

Further, in the present invention, in a case where the N element is Co, it is preferred that the molar ratio of Li/(N+M) i.e. the molar ratio of Li in the lithium composite oxide to the total of the N element and the M element, is particularly from 1.00 to 1.03. In such a case, the particle growth of the lithium composite oxide will be promoted, and particles having a higher density can be obtained.

In the present invention, in a case where the above M element and/or fluorine is incorporated, each of the M element and fluorine is preferably present on the surface of lithium-containing composite oxide particles. By the presence of these elements, on the surface, the important battery characteristics such as safety and the cyclic charge and discharge properties can be improved by their addition in a small amount without bringing about the reduction of the battery performance. The presence of these elements on the surface can be judged by carrying out a spectroscopic analysis such as an XPS analysis with respect to the cathode particles.

In the present invention, an aqueous solution having an M element source dissolved therein is mixed with an N element source powder or its pulverized product to form a slurry. The N element source powder is used as it is, when its average particle size is from 0.1 to 3 μm. In a case where its average particle size is not from 0.1 to 3 μm, the N element source powder is pulverized to bring the average particle size within this range. As a pulverization method in such a case, a known wet pulverization method or a dry pulverization method may, for example, be employed.

In the present invention, in a case where the N element source powder is to be wet-pulverized, an aqueous solution having an M element source dissolved therein may be mixed with an N element source powder to form a slurry, and such a slurry may be wet-pulverized, or using water as a medium, the N element source powder may be formed into a slurry, which may be wet-pulverized. As a method for wet-pulverization, wet ball mill pulverization, wet beads mill pulverization or wet vibration mill pulverization may, for example, be applied. In the present invention, in a case where the N element source powder is to be dry-pulverized, such dry-pulverization is usually carried out before mixing the aqueous solution having an M element source dissolved therein with the N element source powder. The dry-pulverization may, for example, be dry ball mill pulverization or dry jet mill pulverization.

The slurry formed by mixing the aqueous solution having an M element source dissolved therein with an N element source powder and if necessary, by pulverization, as described above, will then be dried for granulation. In the present invention, this slurry to be dried for granulation is preferably such that the average particle size of the N element source powder contained therein is from 0.1 to 3 μm. If the average particle size of the N element source powder is smaller than 0.1 μm, there may be an unnecessary cost-up for pulverization, the viscosity of the slurry may tend to be high, or the particle size after drying for granulation tends to be excessive, such being undesirable. If the average particle size of the N element source powder exceeds 3 μm, the particle growth in drying for granulation tends to be inadequate, such being undesirable. The average particle size of the N element source powder in the above slurry is more preferably from 0.2 to 2.5 μm, particularly preferably from 0.4 to 1.5 μm. Further, the specific surface area of the N element source powder is preferably from 2 to 200 $m^2/g$. In a case where the N element source comprises plural elements and is not a coprecipitate of plural element sources, in order to have the plural elements uniformly dispersed in an atomic state in the particles of cathode active material after the conversion to the cathode active material, the average particle size after pulverization of the mixture of the respective plural element sources is preferably from 0.1 to 1.5 μm, particularly preferably from 0.2 to 1.0 μm.

In the present invention, the slurry using water as a medium and containing the N element source powder, may contain a binder component. As such a binder component, polyvinyl alcohol, carboxymethyl cellulose, polyvinyl pyrrolidone or ammonium polyacrylate may, for example, be mentioned.

In the present invention, it is necessary to employ an aqueous solution having an M element source dissolved therein. If an organic solvent solution having an M element source dissolved therein is used, such an organic solvent solution is not preferred for an industrial method, since it is expensive, hazardous and dangerous as compared with water. In the present invention, the aqueous solution having an M element source dissolved therein is required to be a substantially aqueous solution, and a substantially suspension or colloidal aqueous solution of an M element source is not included in the present invention. If a substantially suspension or colloidal aqueous solution of an M element source is used, it will be impossible to have the M element uniformly impregnated into the interior of the N element source particles, whereby the effects of the present invention can hardly be obtainable. Here, a substantially aqueous solution means that so long as it is an aqueous solution composed mainly of an aqueous solution of an M element source, the M element of the present invention will be uniformly impregnated into the interior of the N element source particles, whereby the effects of the present invention can be obtained, and as a part of such an aqueous solution, a colloidal form or a suspended substance may be present.

In the case of lithium-containing composite oxide particles, the average particle size (D50) in the present invention is meant for a volume average particle size with respect to secondary particles having primary particles agglomerated and sintered one another. In the case of N element source particles, if the particles are composed solely of primary particles, it is meant for the volume average particle size with respect to the primary particles. In a case where the N element source particles are in the form of secondary particles having the primary particles agglomerated, or in the case of a granulated product of an N element source, it is meant for the volume average particle size of the secondary particles of the N element source. The average particle size means a volume basis cumulative 50% size (D50), which is determined by obtaining a volume basis particle size distribution to prepare a cumulative curve with the total volume being 100% and which is the particle size at a point where the cumulative curve becomes 50%. The particle size distribution is obtained by a frequency distribution measured and a cumulative volume distribution curve by a laser scattering particle size distribution measuring apparatus. The measurement of the particle size is carried out by measuring the particle size distribution by dispersing the particles sufficiently in an aqueous solution by e.g. ultrasonic treatment (using, for example, Microtrack HRAX-100, manufactured by Leeds & Northrup Company).

In the present invention, the average particle size (D50) of the granulated product consisting of agglomeration of secondary particles after drying for granulation, is preferably from 5 to 25 μm. If the average particle size is smaller than 5 μm, the press density of the lithium-containing composite oxide tends to be low, and consequently, the volume packing density of the positive electrode tends to be low, and the volume capacity density of the battery tends to be low, such being undesirable. Further, if it exceeds 25 μm, it tends to be difficult to obtain a flat and smooth positive electrode surface, such being undesirable. A particularly preferred average particle size of the granulated product is from 8 to 20 μm.

The above granulated product contains at least an M element source and an N element source and is preferably a granulated product containing the N element and the M element in an atomic ratio of N element:M element being preferably from 0.95:0.05 to 0.9995:0.0005, more preferably from 0.97:0.03 to 0.999:0.001, further preferably from 0.975:0.025 to 0.999:0.001, particularly preferably from 0.975:0.025 to 0.998:0.002.

Further, the N element source contained in the above granulated product is preferably at least one compound selected from the group consisting of a hydroxide, an oxyhydroxide, an oxide and a carbonate, more preferably a hydroxide or an oxyhydroxide, particularly preferably an oxyhydroxide. In such a case, the granulated product can be produced at a low cost, and when it is used as a starting material powder for a cathode active material, the desired characteristics tend to be readily obtainable.

The above granulated product is useful as an intermediate material for the lithium-containing composite oxide as defined in (1) to (11) in the above disclosure of the present invention, particularly as an intermediate material for the lithium-containing composite oxide for a positive electrode for a lithium secondary battery.

In the present invention, the aqueous solution having an M element source dissolved therein is preferably an aqueous solution containing a carboxylate. In the present invention, the carboxylate means a carboxylic acid and its salt and includes a case where the carboxylate is a mixture of a carboxylic acid and its salt. Further, the carboxylate in the present invention has at least one carboxyl group, and at least one hydroxyl group and/or at least one carbonyl group. The presence of such functional groups is preferred, since an aqueous solution having a high concentration of the M element can be formed with respect to various M elements. Particularly, a carboxylic acid having from 2 to 4 carboxyl groups, or a carboxylic acid having from 1 to 4 hydroxyl groups in addition to such carboxyl groups is preferred, since the solubility can be made high. Further, a $C_{1-8}$ aliphatic carboxylate is preferred. If the carbon number is 9 or higher, the solubility of the M element tends to be low, such being undesirable. A particularly preferred carbon number is from 2 to 6.

As a preferred carboxylate of the above $C_{1-8}$ carboxylate, a salt of citric acid, tartaric acid, oxalic acid, malonic acid, malic acid, racemic acid, lactic acid or glyoxylic acid. Particularly preferred is a salt of citric acid, tartaric acid, oxalic acid or glyoxylic acid, whereby the solubility of the M element can be made high, and such a salt is relatively inexpensive. In a case where a carboxylic acid having a high acidity such as oxalic acid is to be employed, if the pH of the aqueous solution is less than 2, depending upon the type of the M element, the N element source tends to be readily dissolved, and accordingly, it is preferred to adjust the pH to a level of from 2 to 12 by an addition of a base such as ammonia. If the pH exceeds 12 depending upon the type of the M element, the N element source tends to be readily dissolved, such being undesirable. As a monocarboxylate, an ammonium salt of a monocarboxylic acid such as formic acid or acetic acid is employed in the present invention in a combination with an M element whereby the solubility can be secured.

The concentration of the aqueous solution containing the above carboxylate to be used in the present invention is preferably high from such a viewpoint that in the subsequent step, the aqueous medium is required to be removed by drying. However, if the concentration is too high, the viscosity tends to be high, and uniform mixing with another element source powder for forming a cathode active material tends to deteriorate, or the solution tends to be hardly penetrated to the N element starting material powder. Accordingly, it is preferably from 1 to 30 wt%, particularly preferably from 4 to 20 wt%.

To the medium for forming the aqueous solution of the carboxylate, in order to increase the solubility of the M element source or the fluorine source to be used as the case requires, an alcohol such as methanol or ethanol, or a polyol having an effect to form a complex may be included. As such a polyol, ethylene glycol, propylene glycol, diethylene glycol, dipropylene glycol, polyethylene glycol or butanediol glycerol may, for example, be mentioned. In such a case, the content is preferably from 1 to 20 wt%.

As the N element source to be used in the present invention, in a case where the N element is cobalt, cobalt carbonate, cobalt hydroxide, cobalt oxyhydroxide or cobalt oxide is, for example, preferably employed. Particularly, cobalt hydroxide or cobalt oxyhydroxide is preferred, since the performance can readily be developed. Further, in a case where the N element is nickel, nickel hydroxide, nickel oxyhydroxide, nickel oxide or nickel carbonate is, for example, preferably employed. Further, in a case where the N element is manganese, manganese dioxide or manganese carbonate is preferably employed.

Further, the N element source may suitably be selected for use among a nickel salt, a cobalt salt, a manganese salt, a nickel-cobalt coprecipitate, a nickel-manganese coprecipitate and a nickel-cobalt-manganese coprecipitate. Here, as the nickel salt, the cobalt salt or the manganese salt, a salt which is substantially insoluble in water will be selected. Specifically, a hydroxide, an oxyhydroxide, an oxide or a carbonate may, for example, be mentioned. Further, as the nickel-cobalt coprecipitate, a nickel-cobalt coprecipitated hydroxide, a nickel-cobalt coprecipitated oxyhydroxide, a nickel-cobalt coprecipitated oxide or a nickel-cobalt coprecipitated carbonate is preferred; as the nickel-manganese coprecipitate, a nickel-manganese coprecipitated hydroxide, a nickel-manganese coprecipitated oxyhydroxide or a nickel-manganese coprecipitated oxide is preferred; and as the nickel-cobalt-manganese coprecipitate, a nickel-cobalt-manganese coprecipitated hydroxide, a nickel-cobalt-manganese coprecipitated oxyhydroxide, a nickel-cobalt-manganese coprecipitated carbonate or a nickel-cobalt-manganese oxide is preferred. More specifically, an N element source containing nickel and cobalt may, for example, be $Ni_{0.8}Co_{0.2}OOH$ or $Ni_{0.8}Co_{0.2}(OH)_2$; and an N element source containing nickel and manganese may, for example, be $Ni_{0.5}Mn_{0.5}OOH$; and an N element source containing nickel, cobalt and manganese may, for example, be $Ni_{0.4}Co_{0.2}Mn_{0.4}OOH$ or $Ni_{1/3}Co_{1/3}Mn_{1/3}OOH$.

As the lithium source to be used in the present invention, lithium carbonate or lithium hydroxide is preferably used. Particularly, lithium carbonate is inexpensive and preferred. The lithium source is preferably employed in the form of a powder having an average particle size (D50) of from 2 to 25 μm. As the fluorine source, a metal fluoride, LiF, or $MgF_2$ may, for example, be selected for use.

The M element source of the aqueous solution of the above carboxylate containing an M element (the aqueous solution having the M element source dissolved) to be used in the present invention, may, for example, be a solid oxide or an inorganic salt such as a hydroxide, a halide, a carbonate or nitrate; an ammonium complex thereof or an organic salt such as an acetate, an oxalate, or a citrate; an organic metal chelate complex; or a compound having a metal alkoxide stabilized by e.g. a chelate agent. Among them, in the present invention, one capable of being uniformly dissolved or dispersed in the aqueous carboxylate solution to be used, is more preferred, and for example, an oxide, a hydroxide, an oxyhydroxide, a water-soluble carbonate, a nitrate, an acetate, an oxalate or a citrate may be mentioned. Particularly, a citrate is preferred, since it has a high solubility. In a case where the M element is Zr, as the M element source, an ammonium zirconium carbonate and/or an ammonium zirconium halide is suitably employed.

The aqueous solution of the above carboxylate containing an M element is preferably adjusted to a pH of from 2 to 12 at which the N element source is hardly soluble. Particularly, an aqueous solution of an oxalate or a citrate has a low pH and is likely to dissolve the N element from the N element source in the process of impregnating the M element into the N element source. Therefore, it is preferred to add ammonia to the aqueous carboxylate solution to adjust the pH to the level of from 2 to 12.

When the aqueous solution of the carboxylate containing an M element to be used in the present invention is to be prepared, the preparation is preferably carried out under heating as the case requires. The heating may be carried out preferably at a level of from 40 to 80° C., particularly preferably from 50 to 70° C. By the heating, dissolution of the M element source will readily proceed, and the M element source can be dissolved constantly in a short time.

Further, the amount of the M element source to be used is adjusted so that a desired ratio of the respective elements can be obtained within the above-mentioned range of $Li_pN_xM_yO_zF_a$ being the formula of the cathode active material to be produced by the present invention.

As a method for impregnating the aqueous solution of the carboxylate containing an M element into the N element source powder or its pulverized product, such an aqueous solution may be sprayed onto such a powder for impregnation. However, it is preferred to put such an N element source powder into such an aqueous solution in a tank, followed by stirring for impregnation, further preferably to sufficiently uniformly mix them to form a slurry by using a twin screw kneader, an axial mixer, a paddle mixer or a turbulizer, for impregnation. The solid content concentration in the slurry is preferably higher so long as mixing can be carried out uniformly, but usually the solid/liquid ratio is preferably from 30/70 to 90/10, particularly preferably from 50/50 to 80/20. Further, it is preferred to carry out vacuum treatment in the above slurry state, whereby the solution may more readily penetrate into the N element source powder.

Removal of the aqueous medium in the slurry composed of a mixture of the aqueous solution of the carboxylate containing the M element, and the N element powder or its pulverized product, is carried out by drying at preferably from 50 to 200° C., particularly preferably from 80 to 120° C., usually from 0.1 to 10 hours. The aqueous medium in the slurry of the mixture may not necessarily be completely removed at this stage since it will be removed in the subsequent firing step, but it is preferably removed as far as possible, since a large quantity of energy will be required to evaporate water in the firing step. In the present invention, the drying for granulation may be carried out by means of spray drying, flash drying, a belt dryer, a Loedige mixer or a twin screw dryer such as a thermoprocessor or a paddle dryer. Among them, spray drying is particularly preferred as the productivity is thereby high.

In a case where spray drying is employed for the drying or granulation, the size of the granulated particles consisting of secondary particles after the granulation may be controlled by selecting the pulverized particle size of the N element source after the wet pulverization, the spraying system, the pressurizing gas-supply rate, the slurry supply rate, the drying temperature, etc. In the present invention, the particle size of the precursor consisting of secondary particles after the drying for granulation will be substantially reflected to the particle size of the lithium-containing composite oxide of the present invention.

Firing after removal of the aqueous medium of the above slurry is carried out at from 700 to 1,100° C. in an oxygen-containing atmosphere. If such a firing temperature is lower than 700° C., conversion to the lithium-containing composite oxide tends to be incomplete. On the other hand, if it exceeds 1,100° C., the durability for charge and discharge cycles or the initial capacity tends to be low. The firing temperature is particularly preferably from 850 to 1,050° C.

Of the lithium-containing composite oxide thus produced, the average particle size D50 is preferably from 5 to 30 μm, particularly preferably from 8 to 25 μm; the specific surface area is preferably from 0.1 to 0.7 $m^2/g$, particularly preferably from 0.15 to 0.5 $m^2/g$; the half value width of the diffraction peak of (110) plane at $2\theta=66.5\pm1°$ as measured by means of X-ray diffraction analysis using CuKα rays as the radiation source, is preferably from 0.08 to 0.14°, particularly preferably from 0.08 to 0.12°; and the press density is preferably from 3.65 to 4.10 $g/cm^3$, particularly preferably from 3.70 to 4.00 $g/cm^3$ in a case where N is cobalt. The process of the present invention has a characteristic such that as compared with the prior art, a high press density can be obtained. In the present invention, the press density means an apparent density of the powder, when the lithium composite oxide powder is pressed under a pressure of 2 $ton/cm^2$. Further, the press density is a numerical value which is interrelated to the volume capacity density. The higher the press density, the higher the volume capacity density tends to be. Further, the lithium-containing composite oxide obtained by the present invention is preferably such that the amount of remaining alkali is preferably at most 0.03 wt %, particularly preferably at most 0.01 wt %.

In a case where a positive electrode for a lithium secondary battery is to be produced from such a lithium-containing composite oxide, the powder of such a lithium-containing composite oxide is mixed with a binder material and a carbon type electroconductive material such as acetylene black, graphite or Ketjenblack. As such a binder material, polyvinylidene fluoride, polytetrafluoroethylene, polyamide, carboxymethyl cellulose or an acrylic resin may, for example, be preferably employed. By using a solvent or a dispersant, the powder of the lithium-containing composite oxide of the present invention, the electroconductive material and the binder are formed into a slurry or a kneaded product, which is then supported on a positive electrode current collector such as an aluminum foil or a stainless steel foil by e.g. coating to form a positive electrode for a lithium secondary battery.

In a lithium secondary battery wherein the lithium-containing composite oxide of the present invention is used as a cathode active material, a film or a porous polyethylene or a porous polypropylene may, for example, be used as a separator. Further, as the solvent for the electrolytic solution of the battery, various solvents may be used, but among them, a carbonate ester is preferred. As such a carbonate ester, each of a cyclic type and a chain type may be used. As the cyclic carbonate ester, propylene carbonate or ethylene carbonate (EC) may, for example, be mentioned. As the chain carbonate ester, dimethyl carbonate, diethyl carbonate (DEC), ethyl methyl carbonate (EMC), methyl propyl carbonate or methyl isopropyl carbonate may, for example, be mentioned.

In the present invention, the above carbonate ester may be used alone or two or more of them may be used as mixed, as the solvent for the electrolytic solution. Otherwise, the above carbonate ester may be used as mixed with other solvents. Further, depending upon the material for an anode active material, a chain type carbonate ester and a cyclic type carbonate ester may be used in combination, whereby the discharge properties, the cyclic durability or the charge and discharge efficiency may sometimes be improved.

Further, in the lithium secondary battery using the lithium-containing composite oxide of the present invention as the cathode active material, a gel polymer electrolyte containing a vinylidene fluoride-hexafluoropropylene copolymer (for example, KYNAR manufactured by ELF Atochem) or a vinylidene fluoride-perfluoropropyl vinyl ether copolymer, may be employed. As the solute to be added to the solvent for the electrolytic solution or to the polymer electrolyte, at least one member of lithium salts is preferably used, wherein e.g. $ClO_4^-$, $CF_3SO_3^-$, $BF_4^-$, $PF_6^-$, $AsF_6^-$, $SbF_6^-$, $CF_3CO_2^-$ or $(CF_3SO_2)_2N^-$ is anion. The lithium salt as the solute is added at a concentration of preferably from 0.2 to 2.0 mol/L (liter) to the solvent for the electrolytic solution or to the polymer electrolyte. If the concentration departs from this range, ionic conductivity will decrease, and the electrical conductivity of the electrolyte will decrease. Particularly preferably, it is from 0.5 to 1.5 mol/L.

In the lithium battery using the lithium-containing composite oxide of the present invention as the cathode active material, as the anode active material, a material which can occlude and discharge lithium ions may be used. The material to form such an anode active material is not particularly limited, however, lithium metal, a lithium alloy, a carbon material, an oxide comprising, as a main component, a metal of Group 14 or 15 of the Periodic Table, a carbon compound, a silicon carbide compound, a silicon oxide compound, titanium sulfide or a boron carbide compound may, for example, be mentioned. As the carbon material, one having an organic material thermally decomposed under various thermal decomposition conditions, artificial graphite, natural graphite, soil graphite, exfoliated graphite or flake graphite, may, for example, be used. Further, as the oxide, a compound comprising tin oxide as a main component may be used. As the negative electrode current collector, a copper foil or a nickel foil may, for example, be used. The negative electrode may be produced preferably by kneading the anode active material with an organic solvent to form a slurry, which is applied on a metal foil current collector, followed by drying and pressing.

The shape of the lithium battery using the lithium-containing composite oxide of the present invention as the cathode active material is not particularly limited. A sheet, film, folding, winding type cylinder with bottom or button shape is selected for use depending upon the particular purpose.

EXAMPLES

Now, the present invention will be described in further detail with reference to Examples. However, the present invention is by no means restricted to such specific Examples.

Hereinafter, the percentage (%) means wt % unless otherwise specified.

Example 1

4.9 g of magnesium carbonate having a magnesium content of 25.8% and 18.9 g of citric acid were added to 50 g of water and dissolved, and further, 31.6 g of an aqueous aluminum lactate solution having an aluminum content of 4.4% was added and mixed to prepare an aqueous solution having the M element dissolved therein. 500 g of cobalt oxyhydroxide having a cobalt content of 59.8% and an average particle size 13 µm, and the aqueous solution having the M element dissolved therein, as prepared above, were added to 400 g of water, followed by pulverization by means of wet ball milling, and further 1,000 g of water was added and mixed to obtain a slurry. The particle size distribution of the cobalt oxyhydroxide after the wet pulverization was measured in a water solvent by means of a laser scattering type particle size distribution measuring apparatus, whereby the average particles size D50 was 1.7 µm. This slurry was spray-dried for granulation. The obtained granulated product had an average particle size of 10.9 µm and a cobalt content of 59.9%. To 198.2 g of this granulated product, 77.9 g of lithium carbonate having a lithium content of 18.7% was mixed, followed by firing at 1,000° C. for 10 hours to obtain $Li_{1.01}Co_{0.97}Mg_{0.01}Al_{0.01}O_2$. The fired product was crushed, and the particle size distribution of the obtained lithium-containing composite oxide powder was measured in a water solvent by means of a laser scattering type particle size distribution measuring apparatus. As a result, the average particle size D50 was 11.8 µm, D10 was 5.7 µm, and D90 was 18.7 µm, and a substantially spherical lithium-containing composite oxide powder having a specific surface area of 0.25 $m^2/g$ as obtained by means of BET method, was obtained.

With respect to this lithium-containing composite oxide powder, an X-ray diffraction spectrum was obtained by using an X-ray diffraction apparatus (RINT 2100 model, manufactured by Rigaku Corporation). In the powder X-ray diffraction using CuKα ray, the half value width of the diffraction peak of (110) plane at 2θ=66.5±1° was 0.112°. The press density of this powder was 3.66 $g/cm^3$.

The above lithium-containing composite oxide powder, acetylene black and a polyvinylidene fluoride powder were mixed in a weight ratio of 90/5/5, and N-methylpyrrolidone was added to form a slurry, which was applied on one side of an aluminum foil having a thickness of 20 µm by a doctor blade. After drying, roll pressing was carried out five times to obtain a positive electrode sheet for a lithium battery.

And, using one punched out from the positive electrode sheet as a positive electrode, using a metal lithium foil having a thickness of 500 μm as a negative electrode, using a nickel foil of 20 μm as a negative electrode current collector, using a porous polypropylene having a thickness of 25 μm as a separator and using a solution of $LiPF_6$/EC+DEC (1:1) having a concentration of 1M (it means a mixed solution of EC and DEC in a weight ratio of 1:1) wherein $LiPF_6$ is the solute, the same applies to solvents mentioned hereinafter) as an electrolytic solution, a pair of simplified sealed cell type lithium batteries made of stainless steels were assembled in an argon globe box.

One battery out of the two was charged up to 4.3 V at a load current of 75 mA per 1 g of the cathode active material at 25° C., and discharged down to 2.5 V at a load current of 75 mA per 1 g of the cathode active material, whereby the initial discharge capacity was obtained. Further, the density of the electrode layer was obtained. Further, with this battery, the charge and discharge cyclic test was sequentially carried out 30 times. As a result, the initial weight capacity density of the positive electrode layer at from 2.5 to 4.3 V at 25° C. was 153 mAh/g and the capacity retention after 30 times of charge and discharge cycle was 98.4%.

Further, the other battery was charged for 10 hours at 4.3 V, and then disassembled in the argon globe box, and the positive electrode sheet after the charging was taken out. The positive electrode sheet was washed, then punched out with a diameter of 3 mm and sealed in an aluminum capsule together with EC, and then, it was heated at a rate of 5° C./min by using a scanning differential calorimeter (DSC6200R, manufactured by Seiko Instruments Inc.), whereby the heat generation starting temperature was measured. As a result, the heat generation starting temperature in the heat generation curve of the 4.3 V charged product was 157° C., and the maximum value of the inclination of the heat generation curve showing the heat generation rate was 471 mW/min. Here, the inclination of the heat generation curve is a numerical value which is deeply interrelated with the safety. The lower the numerical value, the higher the stability during the heating of the lithium-containing composite oxide, and an abrupt exothermic reaction tends to be suppressed. Therefore, from the viewpoint of safety, the lower the inclination of the heat generation curve, the better.

Example 2

15.4 g of an aqueous ammonium zirconium carbonate solution having a zirconium content of 15.1% and 14.3 g of citric acid were added to 500 g of water and dissolved to prepare an aqueous solution having the M element dissolved therein. 500 g of cobalt oxyhydroxide having a cobalt content of 59.8% and an average particle size of 13 μm, and the aqueous solution having the M element dissolved therein, prepared as described above, were added to 400 g of water, followed by pulverization by means of wet ball milling, and 1,000 g of water was further added and mixed to obtain a slurry. The particle size distribution of the cobalt oxyhydroxide after the wet pulverization was measured, whereby the average particle size D50 was 2.2 μm. This slurry was spray-dried for granulation. The obtained granulated product had an average particle size of 14.5 μm and a cobalt is content of 60.3%. To 198.3 g of this granulated product, 77.2 g of lithium carbonate having a lithium content of 18.7% was mixed, followed by firing at 1,000° C. for 10 hours to obtain $Li_{1.0}Co_{0.985}Zr_{0.005}O_2$. The fired product was crushed, and the obtained lithium-containing composite oxide powder was a substantially spherical lithium-containing composite oxide powder having an average particle size D50 of 14.5 μm, D10 of 6.2 μm and D90 of 23.5 μm and having a specific surface area of 0.22 m$^2$/g as obtained by means of BET method.

With respect to this lithium-containing composite oxide powder, the same operation as in Example 1 was carried out, whereby the half value width of the diffraction peak of (110) plane was 0.109°, and the press density was 3.76 g/cm$^3$.

Further, using this lithium-containing composite oxide, a battery was prepared in the same manner as in Example 1. The characteristics of the prepared battery were as follows. The initial weight capacity density of the positive electrode layer was 160 mAh/g, the capacity retention after 30 times of charge and discharge cycle was 98.6%, the heat generation starting temperature in the heat generation curve of the 4.3 V charged product was 162° C., and the maximum value of the inclination of the heat generation curve showing the heat generation rate was 675 mW/min.

Example 3

2.4 g of magnesium carbonate having a magnesium content of 25.8% and 29.4 g of citric acid were added to 50 g of water and dissolved, and 15.9 g of an aqueous aluminum lactate solution having an aluminum content of 4.4% and 1.5 g of an aqueous titanium lactate solution having a titanium content of 8.1% were further added and mixed to prepare an aqueous solution having the M element dissolved therein. 204 g of nickel carbonate having a nickel content of 49.1 g, 168 g of cobalt oxyhydroxide having a cobalt content of 59.8%, 151 g of manganese oxyhydroxide having a manganese content of 62.1% and the aqueous solution having the M element dissolved therein, prepared as described above, were added to 400 g of water, followed by pulverization by means of wet ball milling, and 1,000 g of water was further added and mixed to obtain a slurry. The average particle size D50 of the mixed powder after the wet pulverization was 2.4 μm. This slurry was spray-dried for granulation. The obtained granulated product had an average particle size of 15.5 μm, and the contents of nickel, cobalt and manganese were 19.1%, 19.2% and 17.9%, respectively. 200 g of this granulated product and 77.1 g of lithium carbonate having a lithium content of 18.7% were mixed and fired at 1,000° C. for 10 hours to obtain $Li_{1.024}Ni_{0.322}Co_{0.322}Mn_{0.322}Mg_{0.005}Al_{0.005}Ti_{0.0005}O_2$.

The fired product was crushed, and the obtained lithium-containing composite oxide powder was substantially spherical with an average particle size D50 of 15.6 μm, D10 of 6.9 μm and D90 of 23.4 μm and with a specific surface area of 0.65 m$^2$/g as obtained by means of BET method.

With respect to this lithium-containing composite oxide powder, the same operation as in Example 1 was carried out, whereby the press density was 3.41 g/cm$^3$. Further, using this lithium-containing composite oxide, a battery was prepared in the same manner as in Example 1. The characteristics of the prepared battery were as follows. The initial weight capacity density of the positive electrode layer was 156 mAh/g, the capacity retention after 30 times of charge and discharge cycle was 98.2%, and the heat generation starting temperature in the heat generation curve of the 4.3 V charged product was 220° C.

Example 4

2.4 g of magnesium carbonate having a magnesium content of 25.8% and 32.6 g of citric acid were added to 50 g of water and dissolved, and 15.6 g of an aqueous ammonium zirconium carbonate solution having a zirconium content of 15.1% was further added and mixed to prepare an aqueous solution having the M element dissolved therein. 204 g of nickel carbonate having a nickel content of 49.1 g, 168 g of cobalt oxyhydroxide having a cobalt content of 59.8%, 151 g of manganese oxyhydroxide having a manganese content of 62.1% and the aqueous solution having the M element dissolved therein prepared as described above were added to 400 g of water, followed by pulverization by means of a wet ball milling, and 1,000 g of water was further added and mixed to obtain a slurry. The average particle size D50 of the mixed powder after the wet pulverization was 1.6 μm. This slurry was spray-dried for granulation. The average particle size of the obtained granulated product was 15.8 μm, and the contents of nickel, cobalt and manganese were 19.0%, 19.0% and 17.7%, respectively. 200 g of this granulated product and 76.3 g of lithium carbonate having a lithium content of 18.7% were mixed and fired at 1,000° C. for 10 hours to obtain $Li_{0.024}Ni_{0.322}Co_{0.322}Mn_{0.322}Mg_{0.005}Zr_{0.005}O_2$.

The fired product was crushed, and the obtained lithium-containing composite oxide powder was substantially spherical with an average particle size D50 of 16.0 μm, D10 of 6.7 μm and D90 of 24.1 μm and with a specific surface area of 0.60 m$^2$/g as obtained by means of BET method.

With respect to this lithium-containing composite oxide powder, the operation was carried out in the same manner as in Example 1, whereby the press density was 3.42 g/cm$^3$. Further, using this lithium-containing composite oxide, a battery was prepared in the same manner as in Example 1. The characteristics of the prepared battery were as follows. The initial weight capacity density of the positive electrode layer was 154 mAh/g, the capacity retention after 30 times of charge and discharge cycle was 98.4%, and the heat generation starting temperature in the heat generation curve of the 4.3 V charged product was 221° C.

Example 5

To 1.9 g of magnesium carbonate having a magnesium content of 25.8%, 6.1 g of an aqueous solution containing 50% of glyoxylic acid and 50 g of water were added for dissolution, and 12.5 g of an aqueous aluminum lactate solution having an aluminum content of 4.4% and 6.1 g of an aqueous titanium lactate solution having a titanium content of 8.1% were further added and mixed, whereupon the pH was adjusted to 7.1 by an addition of aqueous ammonia to prepare an aqueous solution having the M element dissolved therein. 500 g of cobalt hydroxide having a cobalt content of 62.5% and an average particle size of 15 μm and the aqueous solution having the M element dissolved therein prepared as described above, were added to 400 g of water, followed by pulverization by means of a wet ball milling, and 1,000 g of water was further added and mixed to obtain a slurry. The average particle size D50 of the cobalt hydroxide after the wet pulverization was 1.3 μm. This slurry was spray-dried for granulation. The average particle size of the obtained granulated product was 12.5 μm, and the content of cobalt was 61.2%. To 195.4 g of this granulated product, 77.6 g of lithium carbonate having a lithium content of 18.7% was mixed, followed by firing at 1,000° C. for 10 hours to obtain $Li_{1.01}Co_{0.98}Mg_{0.004}Al_{0.004}Ti_{0.002}O_2$.

The fired product was crushed, and the obtained lithium-containing composite oxide powder was substantially spherical with an average particle size D50 of 12.8 μm, D10 of 7.0 μm and D90 of 18.3 μm and with a specific surface area of 0.30 m$^2$/g as obtained by means of BET method.

With respect to this lithium-containing composite oxide powder, the operation was carried out in the same manner as in Example 1, whereby the half value width of the diffraction peak of (110) plane was 0.118°, and the press density was 3.68 g/cm$^3$. Further, using this lithium-containing composite oxide, a battery was prepared in the same manner as in Example 1. The characteristics of the prepared battery were as follows. The initial weight capacity density of the positive electrode layer was 158 mAh/g, the capacity retention after 30 times of charge and discharge cycle was 98.8%, the heat generation starting temperature in the heat generation curve of the 4.3 V charged product was 161° C., and the maximum value of the inclination of the heat generation curve showing the heat generation rate, was 607 mW/min.

Example 6

Comparative Example 198.9 g of cobalt oxyhydroxide having a cobalt is content of 59.8% and an average particle size of 13 μm, 78.0 g of lithium carbonate having a lithium content of 18.7%, 1.2 g of magnesium hydroxide having a magnesium content of 41.6% and 1.6 g of aluminum hydroxide having an aluminum content of 34.6%, were mixed and fired at 1,000° C. for 10 hours to obtain $Li_{1.01}Co_{0.97}Mg_{0.01}Al_{0.01}O_2$. The fired product was crushed to obtain a substantially spherical lithium-containing composite oxide powder with an average particle size D50 of 13.4 μm, D10 of 7.8 μm and D90 of 20.0 μm and with a specific surface area of 0.27 m$^2$/g as obtained by means of BET method.

With respect to this lithium-containing composite oxide powder, the operation was carried out in the same manner as in Example 1, whereby the half value width of the diffraction peak of (110) plane was 0.119°, and the press density was 3.63 g/cm$^3$. Further, using this lithium-containing composite oxide, a battery was prepared in the same manner as in Example 1. The characteristics of the prepared battery were as follows. The initial weight capacity density of the positive electrode layer was 152 mAh/g, the capacity retention after 30 times of charge and discharge cycle was 98.5%, the heat generation starting temperature in the heat generation curve of the 4.3 V charged product was 162° C., and the maximum value of the inclination of the heat generation curve showing the heat generation rate, was 851 mW/min.

Example 7

Comparative Example 201.4 g of cobalt oxyhydroxide having a cobalt content of 59.8% and an average particle size of 13 μm and 75.9 g of lithium carbonate having a lithium content of 18.7%, were mixed and fired at 1,000° C. for 10 hours to obtain $LiCoO_2$. The fired product was crushed to obtain a substantially spherical lithium-containing composite oxide powder with an average particle size D50 of 14.1 μm, D10 of 6.4 μm and D90 of 20.0 μm and with a specific surface area of 0.39 m$^2$/g as obtained by means of BET method.

With respect to this lithium-containing composite oxide powder, the operation was carried out in the same manner as in Example 1, whereby the half value width of the diffraction peak of (110) plane was 0.1050, and the press density was 3.60 g/cm$^3$. Further, using this lithium-containing composite oxide, a battery was prepared in the same manner as in Example 1. The characteristics of the prepared battery were as follows. The initial weight capacity density of the positive electrode layer was 162 mAh/g, the capacity retention after 30 times of charge and discharge cycle was 93.2%, the heat generation starting temperature in the heat generation curve of the 4.3 V charged product was 156° C., and the maximum value of the inclination of the heat generation curve showing the heat generation rate, was 970 mW/min.

Example 8

Example of the Present Invention 197.9 g of the granulated product prepared in Example 1, 77.7 g of lithium carbonate having a lithium content of 18.7% and 0.05 g of lithium fluoride were mixed and fired at 1,000° C. for 10 hours to obtain $Li_{0.01}Co_{0.97}Mg_{0.01}Al_{0.01}O_{1.999}F_{0.001}$. The fired product was crushed, and the obtained lithium-containing composite oxide powder was a substantially spherical lithium-containing composite oxide powder with an average particle size D50 of 12.5 μm, D10 of 5.3 μm and D90 of 20.5 μm and with a specific surface area of 0.27 m²/g as obtained by means of BET method.

With respect to this lithium-containing composite oxide powder, the operation was carried out in the same manner as in Example 1, whereby the half value width of the diffraction peak of (110) plane was 0.108°, and the press density was 3.70 g/cm³.

Further, using this lithium-containing composite oxide, a battery was prepared in the same manner as in Example 1. The characteristics of the prepared battery were as follows. The initial weight capacity density of the positive electrode layer was 153 mAh/g, the capacity retention after 30 times of charge and discharge cycle was 98.2%, the heat generation starting temperature in the heat generation curve of the 4.3 V charged product was 161° C. and the maximum value of the inclination of the heat generation curve showing the heat generation rate was 520 mW/min.

INDUSTRIAL APPLICABILITY

The lithium-containing composite oxide obtained by the present invention is useful as a positive electrode for a lithium secondary battery, which has a large volume capacity density, safety and excellent durability for charge and discharge cycles and is further excellent in the low temperature characteristics with a low production cost.

The entire disclosure of Japanese Patent Application No. 2005-282535 filed on Sep. 28, 2005 including specification, claims and summary is incorporated herein by reference in its entirety.

What is claimed is:

1. A process for producing a lithium-containing composite oxide represented by the formula $Li_pN_xM_yO_zF_a$, wherein N is at least one element selected from the group consisting of Co, Mn and Ni, M is at least one element selected from the group consisting of Al, alkaline earth metal elements and transition metal elements other than N, $0.9 \leq p \leq 1.2$, $0.95 \leq x \leq 2.00$, $0 \leq y \leq 0.05$, $1.9 \leq z \leq 4.2$ and $0 \leq a \leq 0.05$, which comprises firing a mixture of a lithium source, an N element source, an M element source and when a is greater than 0, a fluorine source, wherein a slurry is formed by mixing an aqueous solution having an M element source dissolved therein with (1) either an N element source powder or (2) a pulverized product of the N element source powder; optionally after being pulverized, the slurry is dried for granulation to obtain a granulated product, which is mixed with a lithium source powder and when a is greater than 0, a fluorine source powder to obtain a mixture; and the mixture is fired at from 700 to 1,100° C. in an oxygen-containing atmosphere, wherein the aqueous solution having an M element source dissolved therein is an aqueous solution comprising a salt of a carboxylic acid which has at least one carboxyl group, and at least one hydroxyl group, at least one carbonyl group, or at least one hydroxyl group and one carbonyl group, and the slurry is dried for granulation by spray-drying.

2. The process according to claim 1, wherein the N element source powder in the slurry before drying for granulation has an average particle size (D50) of from 0.1 to 3 μm, and the granulated product has an average particle size (D50) of from 5 to 25 μm.

3. The process according to claim 1, wherein the M element source is an ammonium zirconium carbonate, an ammonium zirconium halide, or an ammonium zirconium carbonate and an ammonium zirconium halide.

4. The process according to claim 1, wherein the aqueous solution having an M element source dissolved therein has a pH of from 2 to 12.

5. The process according to claim 1, wherein the N element source is at least one member selected from the group consisting of cobalt hydroxide, cobalt oxyhydroxide, tricobalt tetroxide and cobalt carbonate.

6. The process according to claim 1, wherein the N element source is at least one member selected from the group consisting of a nickel salt, a cobalt salt, a manganese salt, a nickel-cobalt coprecipitate, a nickel-manganese coprecipitate and a nickel-cobalt-manganese coprecipitate.

7. A positive electrode for a lithium secondary battery containing a lithium-containing composite oxide produced by the process as defined in claim 1.

8. A lithium secondary battery comprising the positive electrode for a lithium secondary battery as defined in claim 7.

9. The process according to claim 1, wherein M comprises Al and Mg.

10. The process according to claim 1, wherein M comprises Zr and Mg.

11. The process according to claim 1, wherein M comprises Mg, Al and Zr.

* * * * *